United States Patent
Ohtsuka

(10) Patent No.: US 9,604,284 B2
(45) Date of Patent: Mar. 28, 2017

(54) PORTABLE DRILLING MACHINE

(75) Inventor: Kenji Ohtsuka, Tokyo (JP)

(73) Assignee: NITTO KOHKI CO., LTD., Tokyo (JP)

(*) Notice: Subject to any disclaimer, the term of this patent is extended or adjusted under 35 U.S.C. 154(b) by 520 days.

(21) Appl. No.: 13/518,593

(22) PCT Filed: Dec. 24, 2009

(86) PCT No.: PCT/JP2009/007180
§ 371 (c)(1),
(2), (4) Date: Aug. 17, 2012

(87) PCT Pub. No.: WO2011/077485
PCT Pub. Date: Jun. 30, 2011

(65) Prior Publication Data
US 2012/0320479 A1    Dec. 20, 2012

(51) Int. Cl.
*H02H 5/04* (2006.01)
*H02H 3/00* (2006.01)
*G05B 11/28* (2006.01)
*B23B 45/02* (2006.01)

(52) U.S. Cl.
CPC .......... *B23B 45/02* (2013.01); *B23B 2270/32* (2013.01)

(58) Field of Classification Search
CPC .................................... H02P 3/06; H02P 3/12
USPC ...................... 361/23, 87; 318/599
See application file for complete search history.

(56) References Cited

U.S. PATENT DOCUMENTS

| 3,983,465 A | * | 9/1976 | Tsuboi | B60L 7/003 |
| | | | | 318/376 |
| 5,747,762 A | * | 5/1998 | Fukuda | B25F 5/006 |
| | | | | 200/61.45 R |
| 6,072,675 A | | 6/2000 | Murakami et al. | |
| 6,104,155 A | * | 8/2000 | Rosa | H02P 3/06 |
| | | | | 318/245 |
| 6,380,757 B1 | * | 4/2002 | Draves | G01R 31/34 |
| | | | | 324/765.01 |

(Continued)

FOREIGN PATENT DOCUMENTS

| JP | 9-314409 | 12/1997 |
| JP | 2007-196362 | 8/2007 |

OTHER PUBLICATIONS

International Preliminary Report on Patentability issued Jul. 4, 2012 in International (PCT) Application No. PCT/JP2009/007180.

(Continued)

*Primary Examiner* — Eduardo Colon Santana
*Assistant Examiner* — Gabriel Agared
(74) *Attorney, Agent, or Firm* — Wenderoth, Lind & Ponack, L.L.P.

(57) ABSTRACT

A portable drilling machine wherein when a shorting failure occurs in a circuit part connected to a driving motor, this state is reliably detected and a false start of the motor is reliably prevented. A diving motor control circuit in the portable drilling machine includes a main control section; a triac and a relay which are connected to power supply terminals in series with the driving motor; peripheral circuits (a triac control circuit, a relay control circuit, a triac inspection and determination section, a bypass resistor, etc.) which are related to the triac and relay; and a current measurement section for measuring current flowing in the driving motor.

16 Claims, 9 Drawing Sheets

(56) References Cited

U.S. PATENT DOCUMENTS

| | | | | |
|---|---|---|---|---|
| 7,427,842 B2* | 9/2008 | Kress | ................... | H02H 7/0844 |
| | | | | 173/7 |
| 8,076,873 B1* | 12/2011 | Lucas | ....................... | H02P 1/54 |
| | | | | 318/107 |
| 2009/0196696 A1* | 8/2009 | Otsuka | .................... | B23B 45/02 |
| | | | | 408/6 |
| 2010/0085060 A1* | 4/2010 | Ichikawa | ........... | G01R 31/3277 |
| | | | | 324/503 |

OTHER PUBLICATIONS

International Search Report issued Apr. 6, 2010 in corresponding International (PCT) Application No. PCT/JP2009/007180.

* cited by examiner

PORTABLE DRILLING MACHINE

TECHNICAL FIELD

The present invention relates to a drilling machine for applying a cutting work such as drilling to a workpiece, and, more particularly, to a portable drilling machine performing the cutting work with its body fixed to the workpiece by an electromagnet, etc.

BACKGROUND ART

Usually, a portable drilling machine uses a commercial AC power supply, and when a power switch is turned on by the user, an electromagnet housed in a body base is energized so that the body is firmly attracted to a workpiece such as an iron plate by a magnetic force of the electromagnet. When the user turns on a start switch with the body being fixed to the workpiece in this manner, a drive motor housed in the body is activated to rotationally drive a cutting tool such a drill. When the user then lowers the cutting tool by a manual handle or lever operation for example to press it against the workpiece, the cutting tool rotatingly advances to cut (e.g., drill) the workpiece (e.g., Patent Document 1).

PRIOR ART DOCUMENT

Patent Document

Patent Document 1: Japanese Laid-Open Patent Publication No. 2007-196362

SUMMARY OF THE INVENTION

Problem to be Solved by the Invention

As described above, when the user initially turns on the power switch, the portable drilling machine simply goes into a state where the body is firmly attracted to the workpiece by the magnetic force as a result of energization of the electromagnet but does not activate the motor for the drive until the start switch is subsequently turned on.

However, if a short-circuit failure occurs in an electronic component used in a circuit that controls the drive motor, esp., in a switching element connected in series with the drive motor, the drive motor may unexpectedly start the instant that the power switch is turned on. Additionally, in this case, turning off the power switch is the only way to stop the rotation of the drive motor.

Furthermore, in order to alleviate a shock applied to a transmission mechanism such as gears and a tool holding unit intervening between the drive motor and the cutting tool when the drive motor is activated, this type of portable drilling machine may employ a soft-start technique for gradually raising a load current to the drive motor through the switching control of the switching element. When the switching element has a short-circuit failure as described above, however, the soft start does not work and the motor starts at a large short-circuit current from the beginning. As a result of this, the transmission mechanism and the tool holding unit are subjected to a strong shock and become easily damaged or degraded.

One of various types of portable drilling machines electrically performs the advancing/retreating movement of the cutting tool relative to the workpiece by a motor-driven feed mechanism in place of the manual handle operation. In such type of machine, if a short-circuit failure occurs in an electronic component used in a circuit that controls a motor for electric feed, esp., in a switching element connected in series with the feed motor, the feed motor may unexpectedly start the instant that the power switch is turned on, so that turning on a clutch causes the advancing movement of the cutting tool. This is also a problem to be improved.

The present invention solves the problems of the prior art described above and provides a portable drilling machine designed to securely detect a state where a short-circuit failure occurs in a circuit component connected in series with a drive motor, to thereby securely prevent the motor from falsely starting.

Means for Solving the Problem

A portable drilling machine according to a first aspect of the present invention includes a drive motor for rotationally driving a cutting tool; a motor control unit for controlling actions of the drive motor; a portable main body mounted with the drive motor and the motor control unit; and a fixing unit for fixing the main body to a workpiece; the motor control unit including a switching element and a circuit breaker that are connected in series with the drive motor to power-supply terminals; a first resistor (72) connected in parallel with the circuit breaker; a first determining unit (70) connected in parallel with the switching element, for determining whether the switching element has a short-circuit failure; a switching control unit for controlling the switching element; and an on-off control unit (52, 68) for controlling the circuit breaker.

A portable drilling machine according to a second aspect of the present invention includes a rotation driving unit including a drive motor for rotationally driving a cutting tool; a feed motor for advancing or retreating the cutting tool relative to the workpiece; a motor control unit for controlling actions of the feed motor; a portable main body mounted with the rotation driving unit, the feed motor, and the motor control unit; and a fixing unit for fixing the main body to a workpiece; the motor control unit including a switching element and a circuit breaker that are connected in series with the feed motor to power-supply terminals; a first resistor (120) connected in parallel with the circuit breaker; a first determining unit (118) connected in parallel with the switching element, for determining whether the switching element has a short-circuit failure; a switching control unit for controlling the switching element; and an on-off control unit (52, 116) for controlling the circuit breaker.

According to the portable drilling machine of the present invention, the switching element is kept off by the switching control circuit while the circuit breaker is kept off by the on-off control unit with the main body being fixed to the workpiece by the fixing unit, whereby it can be determined by the first determining unit whether the switching element is short-circuited. Furthermore, the circuit breaker is kept off by the on-off control unit while the switching element is turned on by the switching control unit, whereby it can be determined whether the circuit breaker is short-circuited. Parallel connection of the first resistor with the circuit breaker enables the switching element to be checked while keeping the circuit breaker off, thereby achieving suppression of a damage deterioration, welding, etc., of the circuit breaker.

According to a preferred form of the present invention, the fixing unit has an electromagnet integrally incorporated in the main body, the fixing unit energizing the electromagnet when a power switch goes on to electromagnetically adhere to the workpiece, the fixing unit deenergizing the electromagnet when the power switch goes off to release electromagnetic adhesion.

According to another preferred form, in the motor control unit immediately after fixing the main body to the workpiece by the fixing unit as a result of a power switch on for checking whether the switching element has a short-circuit failure, the switching control unit keeps the switching element off, the on-off control unit keeps the circuit breaker off, and the first determining unit issues a determination result that depends on magnitude of a voltage across terminals of the switching element.

According to a further preferred form, the first determining unit includes a light-emitting element connected in parallel with the switching element; a light-receiving element paired with the light-emitting element to make up a photo coupler; and a binary signal generation circuit connected to the light-receiving element, for generating a signal having a first logical value (H level) when the light-receiving element is inactive and for generating a signal having a second logical value (L level) when the light-receiving element is active. Preferably, a second resistor (90, 126) is provided that is connected in parallel with the switching element and in series with the light-emitting element.

According to a still further form, the motor control unit includes a current measuring unit that measures a current value of a current flowing through the drive motor or the feed motor; and a second determining unit (52) for determining whether the circuit breaker has a short-circuit failure. In this case, in the motor control unit immediately after fixing the main body to the workpiece by the fixing unit as a result of a power switch on for checking whether the circuit breaker has a short-circuit failure, the on-off control unit keeps the circuit breaker off, the switching control unit subjects the switching element to a switching control at a desired duty, and the second determining unit compares a current measurement value acquired by the current measuring unit with a predetermined reference value to issue a determination result depending on a result of the comparison.

According to a yet further form, in the motor control unit while the drive motor or the feed motor rotationally drives the tool holding unit in response to a predetermined switching operation, the on-off control unit keeps the circuit breaker on, and the switching control unit subjects the switching element to a switching control at a desired duty.

Effect of the Invention

According to the portable drilling machine of the present invention, the above configuration and operation enable a secure detection of the state where a short-circuit failure occurs in a circuit component connected in series with the drive motor, thereby certainly preventing the motor from falsely starting to improve the safety and reliability.

MODES FOR CARRYING OUT THE INVENTION

A preferred embodiment of the present invention will now be described with reference to the accompanying drawings.

Figure 1:
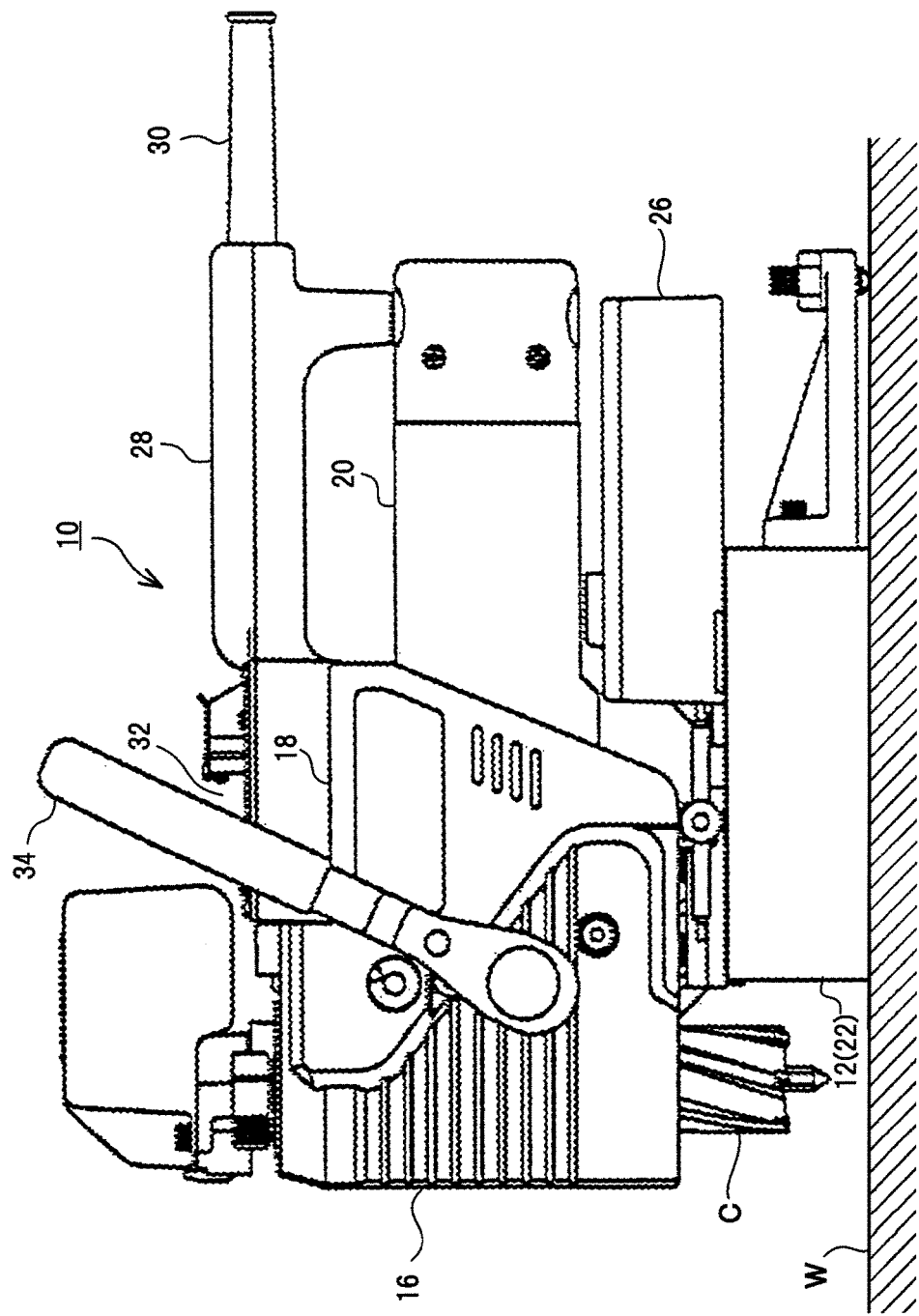
FIG. 1 is a side view depicting an external appearance of a portable drilling mechanism in accordance with an embodiment of the present invention.

FIG. 1 depicts an external appearance of a portable drilling machine in accordance with an embodiment of the present invention. The portable drilling machine includes a main body 10 having predetermined mechanical components and electromechanical/electronic components mounted on or fitted to proper locations in their respective units.

The main body 10 includes a cube-shaped base 12 placed on a workpiece W; a longitudinally extending tubular casing 16 fixed on the front of the base 12 via a bolt, etc.; and a tubular casing 20 transversely extending over the base 12 and integrally fitted to the back of the longitudinal tubular casing 16 via a gear box 18.

The base 12 is composed of an electromagnet 22 for electromagnetically fixing the main body 10 to the workpiece W in an attachable and detachable manner. The transverse tubular casing 20 houses a drive motor 42 (FIG. 2) described later. The gear box 18 houses a gear train (not depicted) drivingly coupled to an output shaft of the drive motor 42. On the base 12 is fitted a circuit box 26 that houses a circuit board mounted on the drilling machine. The transverse tubular casing 16 houses, for example, a rotatable holding unit or an arbor (not depicted) that removably holds a cutting tool, e.g., an annular cutting edge C, and a manual feed mechanism (not depicted) for vertically advancing or retreating the arbor relative to the workpiece W.

In this embodiment, the drive motor 42, the gear train, the arbor, and a drive motor control circuit 44 (FIG. 2) described later make up a rotation driving unit for rotationally driving the annular cutting edge C.

The main body 10 has at its top a grip 28 extending between the rear of the transverse tubular casing 20 and the back of the longitudinal tubular casing 16. The grip 28 is hollow and has a rear end fitted with a sheath 30 through which an electric cable (not depicted) extends and a front end provided with an operation panel 32 including various operation buttons (switches) and displays. The longitudinal tubular casing 16 has at its one side an operation lever or handle 34 for driving the manual feed mechanism.

Figure 2:
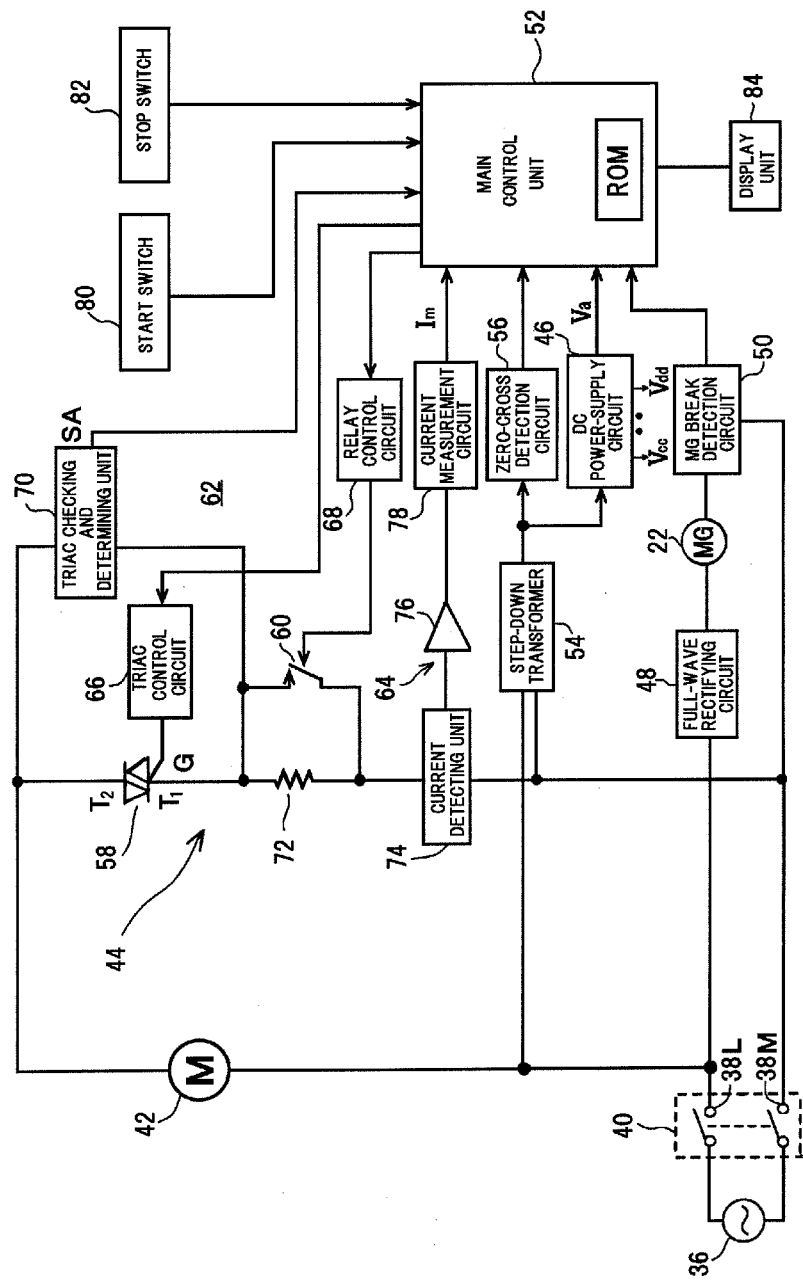
FIG. 2 is a block diagram depicting an electrical configuration of the portable drilling mechanism in accordance with the embodiment.

FIG. 2 depicts in block diagram an electrical circuit configuration of the drilling machine. This drilling machine uses a commercial single-phase AC power supply 36 for example. A manual power switch 40 of push button type for example is electrically interposed between the AC power supply 36 and power-supply terminals 38L and 38M. When the power switch 40 is activated (switched on), electrical units go into active state or action enabled state. When the power switch 40 is deactivated (switched off), all electrical circuits go into action stop or pause state.

The drive motor 42 is an AC commutator motor for example and is electrically connected to the power-supply terminals 38L and 38M. To the power-supply terminals 38L and 38M are further connected the drive motor control circuit 44 for controlling the action of the drive motor 42, a DC power-supply circuit 46 for generating a DC internal power-supply voltage, the electromagnet 22, etc.

The electromagnet 22 is connected to the power-supply terminals 38L and 38M by way of a full-wave rectifying circuit 48 and a break detection circuit 50. The full-wave rectifying circuit 48 full-wave rectifies a commercial AC to supply a DC electric current to the electromagnet 22. The break detection circuit 50 checks whether the electromagnet 22 is energized or not when the power switch 40 is on, and if the electromagnet 22 is not energized, then it determines that a coil of the electromagnet 22 is disconnected, to impart an alarm signal to a main control unit 52.

The DC power-supply circuit 46 is e.g., a series regulator or a three-terminal regulator and converts a commercial AC voltage input via a step-down transformer 54 into a DC voltage to supply a plurality of DC power-supply voltages Va, Vcc, Vdd, . . . with different rated values to the units.

A zero-cross detection circuit 56 connected to the secondary side of the step-down transformer 54 detects a zero-crossing point of commercial AC cycles and imparts a timing pulse with a required commercial frequency for the switching control of each cycle of a triac 58 described later to the main control unit 52.

The drive motor control circuit 44 includes the main control unit 52; the triac (switching element) 58 as a semiconductor switching element and a mechanical relay (circuit breaker) 60 that are connected in series with the drive motor 42 to the power-supply terminals 38L and 38M; a peripheral circuit 62 associated with the triac 58 and the relay 60; and a current measuring unit 64 for measuring an electric current flowing through the drive motor 42.

The main control unit 52 is a microcomputer that provides, in accordance with a software (program) stored in an internal storage (ROM), not only control to the units of the drive motor control circuit 44 but also individual or overall control for all functions, actions, and sequences of the drilling machine.

The peripheral circuit 62 includes a triac control circuit 66 that provides switching control for the triac 58 in response to a control signal from the main control unit 52; a relay control circuit 68 that controls the relay 60 in response to a control signal from the main control unit 52; a triac checking and determining unit 70 that provides a determination result through a triac check described later; and a bypass resistor 72 connected in parallel with the relay 60.

The current measuring unit 64 includes a current detecting unit 74 that is a current transformer fitted to a conductor, e.g., a cable through which an electric current flows to the drive motor 24; an amplification circuit 76 that amplifies an output signal of the current detecting unit 74 at a predetermined amplification factor; and a current measurement circuit 78 that, based on an output signal of the amplification circuit 76, calculates a current measurement value of an electric current (motor current) flowing through the drive motor 42. The current measurement circuit 78 has an A/D converter and a digital operational circuit. The current measurement circuit (the A/D converter and the digital operational circuit) 78 may be incorporated in the main control unit 52.

The main control unit 52 connects to e.g., a start switch 80 for activating the drive motor 42 (i.e., starting the rotational drive of the annular cutting edge C), a stop switch 82 for stopping the drive motor 42 (i.e., for stopping the rotational drive of the annular cutting edge C), and a display 84 that indicates various alarms, action states, etc.

The start switch 80 and the stop switch 82 are e.g., push-button type manual switches, and the display 84 is composed of e.g., LED lamps. The switches 80 and 82 and the display 84 are disposed together with the power switch 40 in operation panel 32 (FIG. 1).

Figure 3:
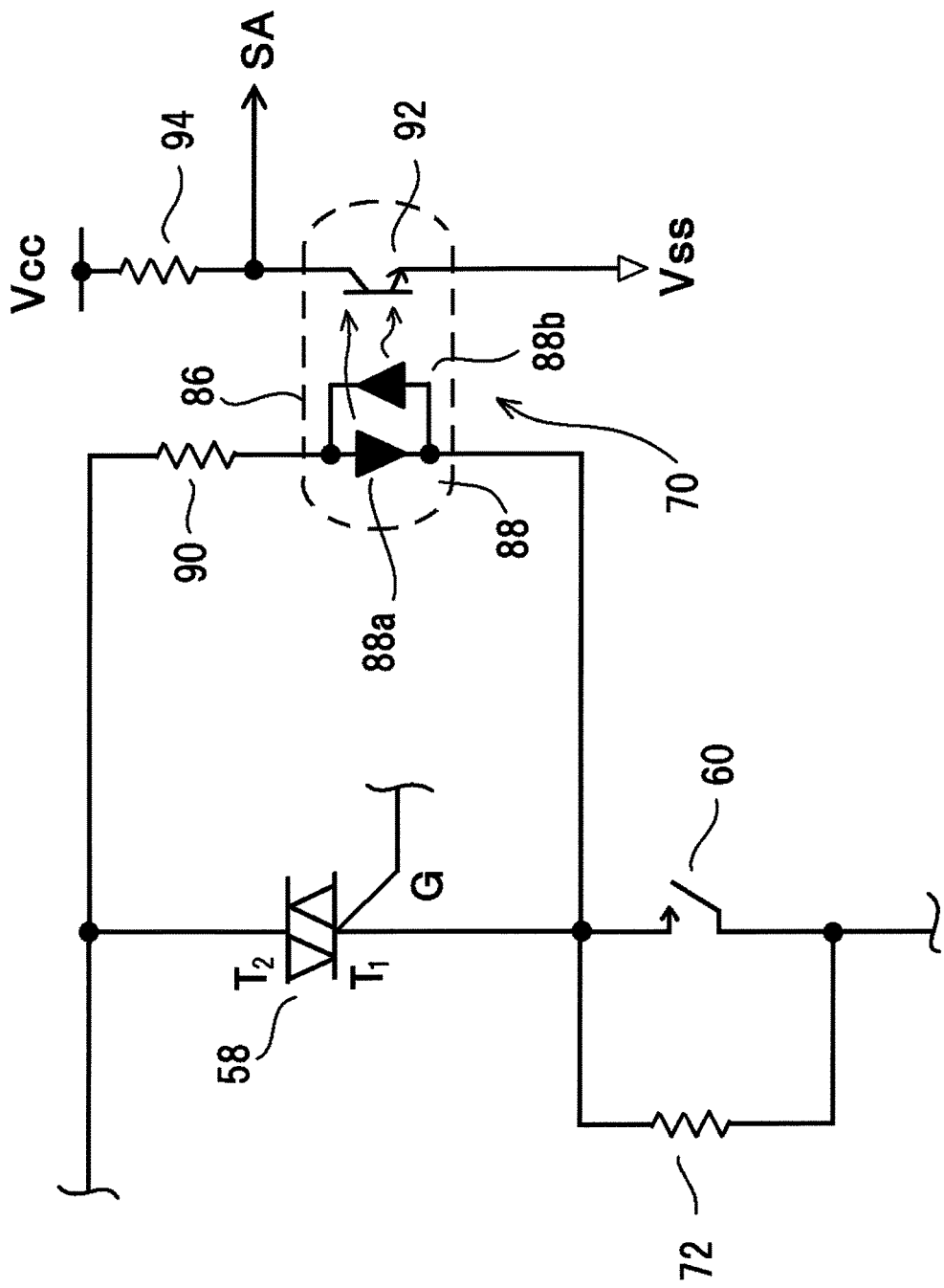
FIG. 3 is a circuit diagram depicting a configuration example of a triac checking and determining unit.

FIG. 3 depicts a preferred configuration example of the triac checking and determining unit 70. This configuration example uses a photo coupler 86 whose light-emitting element 88 and a bypass resistor 90 make up a series circuit that is connected in parallel with the triac 58.

The light-emitting element 88 is composed of a pair of light-emitting diodes 88a and 88b connected in parallel so as to have mutually opposite polarities. A light-receiving element 92 of the photo coupler 86 is e.g., a photo transistor having an emitter terminal connected to a terminal at a ground potential Vss and a collector terminal connected via a resistor 94 to a terminal at a DC power-supply voltage Vcc and connected as an output terminal to an input port of the main control unit 52.

In such a configuration example, an output signal SA from the photo coupler 86 depends on a terminal-to-terminal (T1-T2) voltage of the triac 58. Specifically, when the terminal-to-terminal (T1-T2) voltage of the triac 58 is higher than a predetermined threshold value VTH, an electric current greater than a certain value flows through the bypass resistor 90 and the light-emitting element 88 (either of the light-emitting diodes 88a and 88b depending on the polarity) so that the light-emitting element 88 emits light to activate the photo transistor 92, allowing the output signal SA to go to low level that is substantially equal to the ground potential VSS. When the terminal-to-terminal (T1-T2) voltage of the triac 58 is lower than the threshold value VTH, however, little or no current flows through the bypass resistor 90 and the light-emitting element 88 so that the light-emitting element 88 emits no light to inactivate the photo transistor 92, allowing the output signal SA to go to high level that is substantially equal to the power-supply voltage Vcc.

Since the triac checking and determining unit 70 uses the photo coupler 86 as described above, a drive circuit system through which the motor current flows is electrically isolated and separated from a control system of the main control unit 86, thereby providing an advantageous configuration for the safety of the control system.

Figure 4:
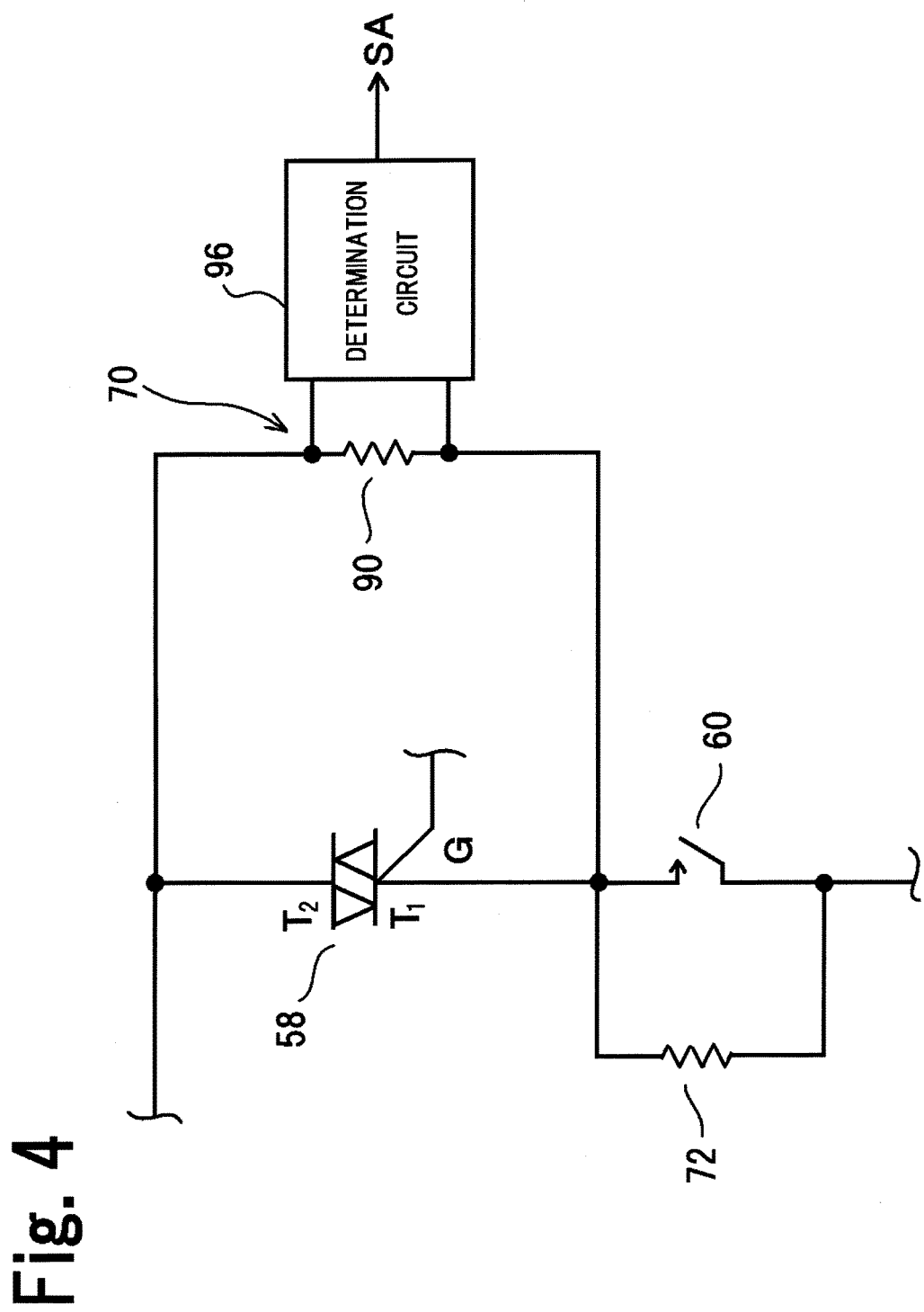
FIG. 4 is a block diagram depicting another configuration example of the triac checking and determining unit.

As another configuration example of the triac checking and determining unit 70, as depicted in FIG. 4, only the bypass resistor 90 may be connected in parallel with the triac 58, and the terminal-to-terminal voltage of the bypass resistor 90 may be compared with a predetermined reference value by a determination circuit 96 so that a binary determination result (output signal SA) can be provided depending on the comparison result. It is however noted that this configuration example needs more components for an isolation circuit required to electrically isolate the motor drive circuit and the control circuit, resulting in an increased cost.

Figure 5:
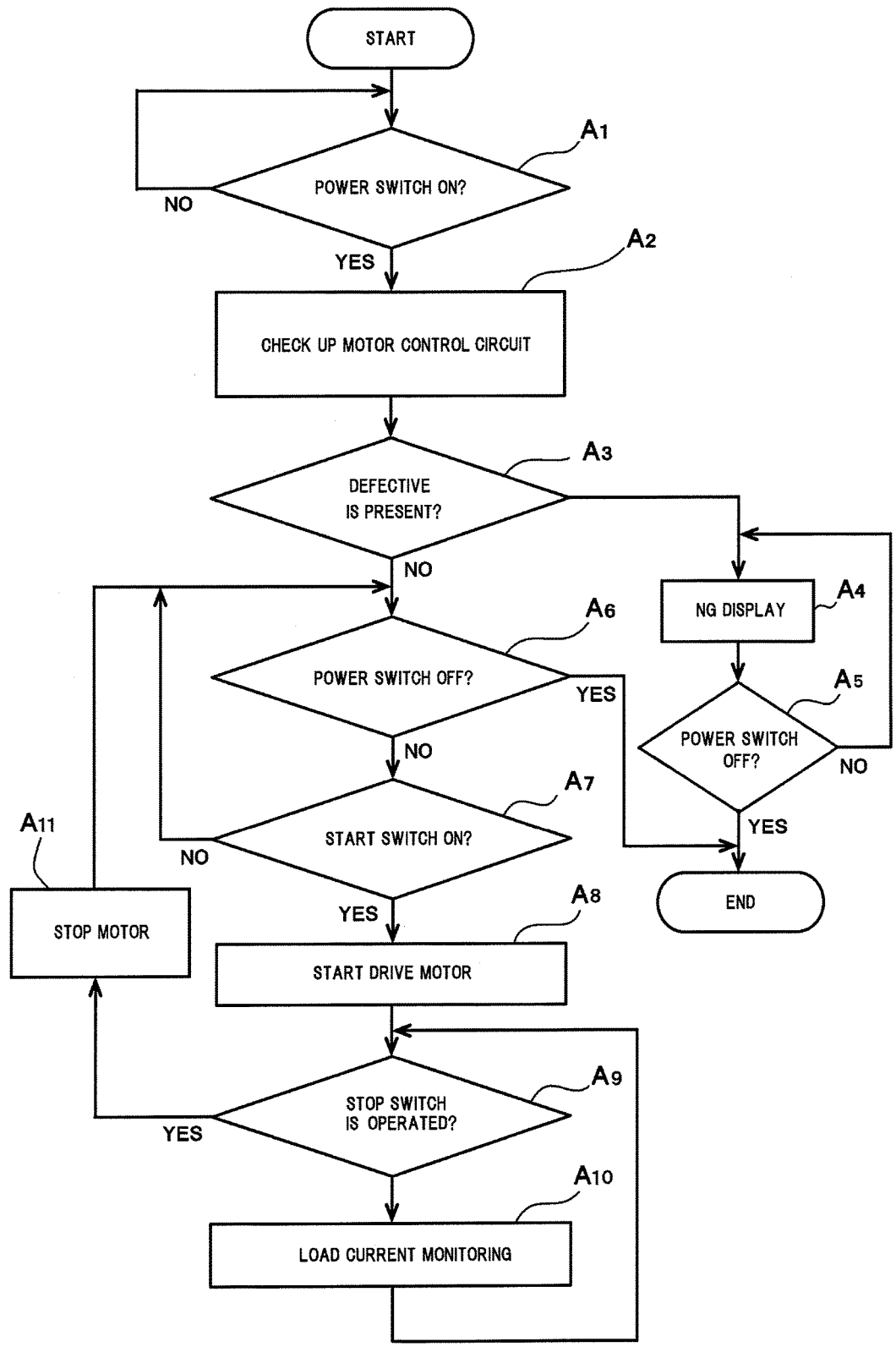
FIG. 5 is a flowchart depicting a procedure of general action of the portable drilling machine of the embodiment.

FIG. 5 depicts a procedure of general action of the portable drilling machine.

The user can hold the grip 28 of the main body 10 to carry the portable drilling machine to any site and places it on a workpiece W at a desired position to thereafter turn on the power switch 40.

When the power switch 40 is turned on (step A1), an AC power from the AC power supply 36 is fed via the power-supply terminals 38L and 38M to not only the drive motor control circuit 44 but also to the electromagnet 22. In the drive motor control circuit 44, the main control unit 52 boots up a control program to start control actions to first check up the interior of the motor control circuit (step A2). If a defective is present among electrical components to be checkup as will be described later as a result of the motor control circuit checkup process, then an alarm display (NG display) indicative thereof continues to appear until the power switch 40 is turned off (steps A3→A4→A5). The motor control circuit checkup process (step A2) is a function featuring the present invention and will be described in detail later.

Furthermore, the main control unit 52 receives from the break detection circuit 50 confirmation information on whether the electromagnet 22 is normally energized, i.e., on whether the main body 10 is firmly fixed to the workpiece W by a magnetic force of the electromagnet 22, and if the electromagnet 22 is not energized, issues a predetermined alarm through the display 84.

Usually, after activating the power switch 40, the user manually turns on the start switch 80. When the start switch 80 is turned on (step A7), the drive motor is started in response thereto (step A8). For rotational action of the drive motor 42, the main control unit 52 keeps the relay 60 on and provides a switching control for the triac 58 through the triac control circuit 70.

Preferably, a soft start is applied when starting the drive motor 42. Specifically, in order to allow the duty flowing the motor current through the drive motor 42 to gradually increase from a minimum value to a maximum value, the phase of a trigger signal is linearly changed that is applied to a gate G of the triac 58 in synchronism with each half cycle of the commercial power-supply voltage. This allows the drive motor 42 to smoothly increase the rotation speed from a standstill state up to a set value, enabling suppression of a shock at the start applied to the transmission mechanism such as gears or to the arbor.

After activating the start switch 80, the user turns the handle 34 in a positive direction (counterclockwise in FIG. 1) to lower the annular cutting edge C to press it against the workpiece W. Then, the annular cutting edge C rotatingly advances into the workpiece W, of which reaction causes a rise in the torque of the drive motor 42 to increase the motor current, i.e., the load current.

During the cutting work, the main control unit 52 monitors the load current by the current measuring unit 64 (step A10). Through this monitoring, the measurement value of the load current is compared with the predetermined reference value to determine based on the comparison result whether the load current is excessive (i.e., is an overload). When it is in the overloaded state, safety measures are taken such as providing a predetermined alarm display by the display 84 or compulsorily stopping the drive motor 42.

When the annular cutting edge C bites deeply into or penetrates the workpiece W to complete a desired cutting work by the turning operation of the handle 34 as described above, the user turns the handle 34 in the opposite direction (clockwise in FIG. 1) to raise (retreat), the annular cutting edge C and thereafter press a button of the stop switch 82.

When the stop switch 82 is operated (step A9), the drive motor is stopped in response thereto (step A11). In order to end the rotational action of the drive motor 42, the main control unit 52 stops the switching control for the triac 58 and switches the relay 60 to off.

Usually, the user temporarily turns off the power switch 40 after stopping the rotation of the drive motor 42 (step A6). As a result of this, all the units of the motor control circuit 44 go off while simultaneously the electromagnet 22 is deenergized so that the main body 10 can be released from the magnetically attractive fixation and separated from the workpiece W.

Figure 6:
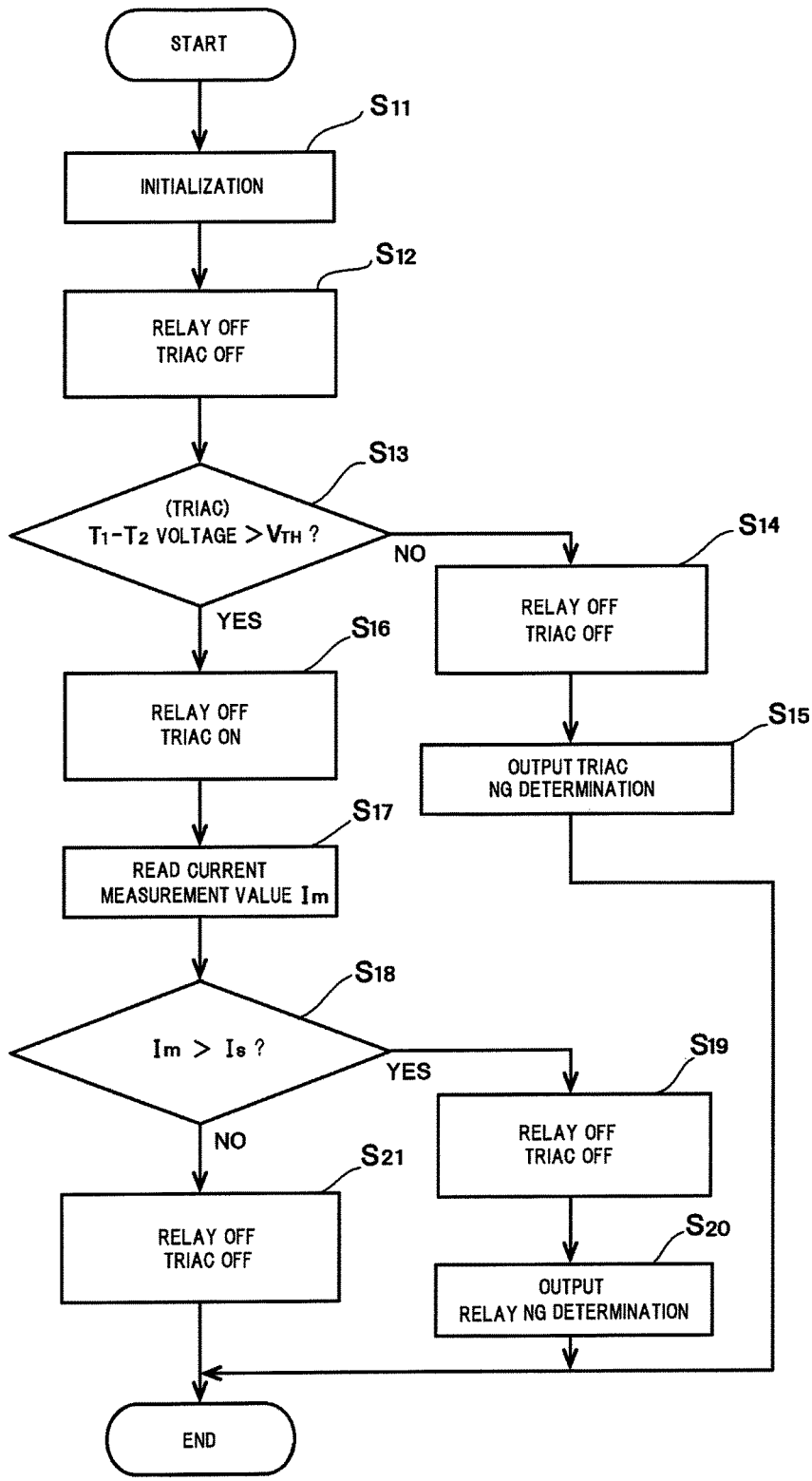
FIG. 6 depicts a detailed procedure of checkup of a motor control circuit in this embodiment.

FIG. 6 depicts a detailed procedure of the action (step S2) of checking up the motor control circuit in this embodiment.

As described above, this checkup action (step S2) is carried out immediately after the power switch 76 is turned on. First, the main control unit 52 performs initialization needed for this checkup action and for the subsequent device actions (steps A2 to A11) (step S11).

Next, the main control unit 52 confirms that the relay 60 and the triac 58 are both off (step S12), and thereafter receives an output signal SA from the triac checking and determining unit 70 to determine whether the triac 58 undergoes a short-circuit failure.

Upon this checkup, no trigger signal is imparted to the triac 58 at all, and hence, unless the triac 58 has a short-circuit failure, an AC current from the AC power supply 36 flows through a closed circuit that includes the drive motor 42, the triac checking and determining unit 70 (the bypass resistor 90 and the light-emitting diodes 88a/88b), and the bypass resistor 72 without any flow through the triac 58 at all. The current value at this time is defined by the power-supply voltage of the AC power supply 36, a winding impedance of the drive motor 42, and resistance values of the bias resistors 90 and 72 and is set so as to cause the light-emitting diodes 88a/88b to emit light at a sufficient light intensity. For this reason, the photo transistor 92 conducts in the triac checking and determining unit 70, allowing the output signal SA to go low. Accordingly, if the output signal SA received from the triac checking and determining unit 70 is low, the main control unit 52 regards the triac 58 as being free from any short-circuit failure and normal (step S13).

It is to be noted that since the bypass resistor 72 has a large resistance value (e.g., 100 kiloohms), the value of a current flowing through the drive motor 42, the triac checking and determining unit 70, the bypass resistor 72, etc., is so small as not to activate the drive motor 42.

If the triac 58 has a short-circuit failure, however, the triac 58 conducts AC current from the AC power supply 36 in a short-circuited manner even when any trigger signal is not fed to the triac 58 at all, so that no current flows through the triac checking and determining unit 70, leaving the output signal SA low. Thus, if the output signal SA received from the triac checking and determining unit 70 is high, the main control unit 52 regards the triac 58 as having a short-circuit failure (step S13). In this case, it is confirmed that the relay 60 and the triac 58 are both off (step S14), after which a triac no-good (NG) determination is output (step S15) to end this motor control circuit checkup action.

It is again to be noted that since the bypass resistor 72 has a large resistance value (e.g., 100 kiloohms), the value of a current flowing through the closed circuit including the drive motor 42, the triac checking and determining unit 70, the bypass resistor 72, etc., is so small as not to activate the drive motor 42.

In case the triac 58 is determined to be normal through the above triac check, the relay 60 is then checked. In this relay check, the main control unit 52 turns on the triac 58 through the triac control circuit 66 while keeping the relay 60 off through the relay control circuit 68 (step S16). In this action of turning on the triac 92, the triac 58 is subjected to switching control at a desired duty (e.g., 100%) for a certain period of time (e.g., 0.1 sec) for example.

During such on-action of the triac 58, unless the relay 60 undergoes a short-circuit failure, the electric current from the AC power supply 36 flows through the closed circuit including the drive motor 42, the triac 58, and the bias resistor 72. By choosing a considerably high value (e.g., 100 kΩ or more) as the resistance value of the bias resistor 72, the current value at this time can be set to a considerably low value (several milliamperes or less). At this time, the period of time is short during which the triac 58 is on and the resistance value of the bypass resistor 72 is large, with the result that the value of a current flowing through the drive motor 42, the triac checking and determining unit 70, the bypass resistor 72, etc., is so small as not to activate the drive motor 42.

In case that the relay 60 suffers from a short-circuit failure due to welding, etc., however, the electric current from the AC power supply 36 flows through the closed circuit including the drive motor 42, the triac 58, and the short-circuited relay circuit 60 without passing through the bias resistor 72 during the on-action of the triac 58, resulting in a considerably large electric current value (e.g., several amperes or more). At this time, the period of time is short during which the triac 58 is on, with the result that the drive motor 42 hardly rotates.

The main control unit 52 reads a measurement value Im of a current flowing through the drive motor 42 while the triac 58 is on by way of the current measuring unit 64 (step S17) and compares the current measurement value Im with a predetermined reference value Is (step S18).

When the comparison result is Im>IS, the relay 60 is regarded as having a short-circuit failure and it is confirmed that the relay 60 and the triac 58 are both off (step S19), after which a relay no-good (NG) determination is output (step S20) to end this checkup action of the motor control circuit.

When the comparison result is Im<IS, the relay 60 is regarded as normal i.e., not having a short-circuit failure and it is confirmed that the relay 60 and the triac 58 are both off (step S21), to thereafter end this checkup action of the motor control circuit.

As described above, this embodiment checks immediately after the power switch 40 is turned on whether a short-circuit failure occurs in the triac 58 that is a switching element for controlling the rotational action of the drive motor 42 that is an AC motor and in the relay 60 that is a circuit breaker connected in series with the triac 58, and, when the short-circuit failure occurs, outputs an alarm (NG determination) thereof (steps S15 and S20) to urge the user to stop the work, i.e., to turn off the power switch 40 (step A5). In this manner, when a short-circuit failure occurs in the triac 58 or the relay 60 of the drive motor control circuit 44, an alarm display is continued to be provided without activating the drive motor 42, thereby improving the safety and reliability of the portable drilling machine.

The triac checking and determining unit 70 for use in the checking of the triac 58 can electrically isolate the motor drive circuit system from the control circuit system associated with the main control unit 52 by the action of the photo coupler 86, thereby ensuring the safety of the control circuit system.

Since the resistor 90 is connected in parallel with the triac 58 and in series with the light-emitting element 88 of the triac checking and determining unit 70, a risk can be obviated of an excessive current flowing through the light-emitting element 88 when the triac 58 is off and when the relay 60 is on or short-circuited.

The bypass resistor 72 connected in parallel with the relay 60 also has an important function. In the event of not having the bypass resistor 72, the relay 60 needs to be turned on when the triac 58 is checked. In the event that the triac 58 suffers from a short-circuit failure, however, an extremely large electric current flows through the motor drive circuit in the process of checking thereof. Although this large electric current can be shut off by turning off the relay 60, a heavy burden is imposed on the relay 60, which may easily induce a damage or welding at the relay contact. Since this embodiment is provided with the bypass resistor 72, the triac 58 can be checked while keeping the relay 60 off as described above. Thus, the burden on the relay 60 can be alleviated and the damage deterioration or welding at the relay contact can be suppressed.

By virtue of having the bypass resistor 72, an even higher determination accuracy can be assured in the relay checking. Specifically, in the event of not having the bypass resistor 72, it cannot necessarily be hastily concluded that the relay 60 be free from a short-circuit failure even though the current measurement value Im obtained from the current measuring unit 64 is zero on checking the relay 60, if taking into consideration a possibility that the winding of the drive motor 42 may be broken.

In this respect, according to this embodiment, incase that the current measurement value Im obtained from the current measuring unit 64 is lower than the reference value Is on the relay checking, a comparison decision is further made of whether Im is zero so that it can be determined whether the winding of the drive motor 42 is broken or the relay 60 suffers from a short-circuit failure.

In the above embodiment, when a short-circuit failure occurs in the triac (switching element) 58 or the relay (circuit breaker) 60 that is used in the drive motor control circuit 44 for controlling the action of the drive motor 42, the defective state is securely detected so as to certainly prevent or obviate an false start of the drive motor 42.

By the way, the portable drilling machine may possibly electrically perform the advancing/retreating movement of the cutting tool relative to the workpiece by use of the motor-driven feed mechanism in place of the manual handle operation. The present invention is applicable also to a motor control circuit for controlling the action of the feed motor in such an electric feed mechanism.

Figure 7:
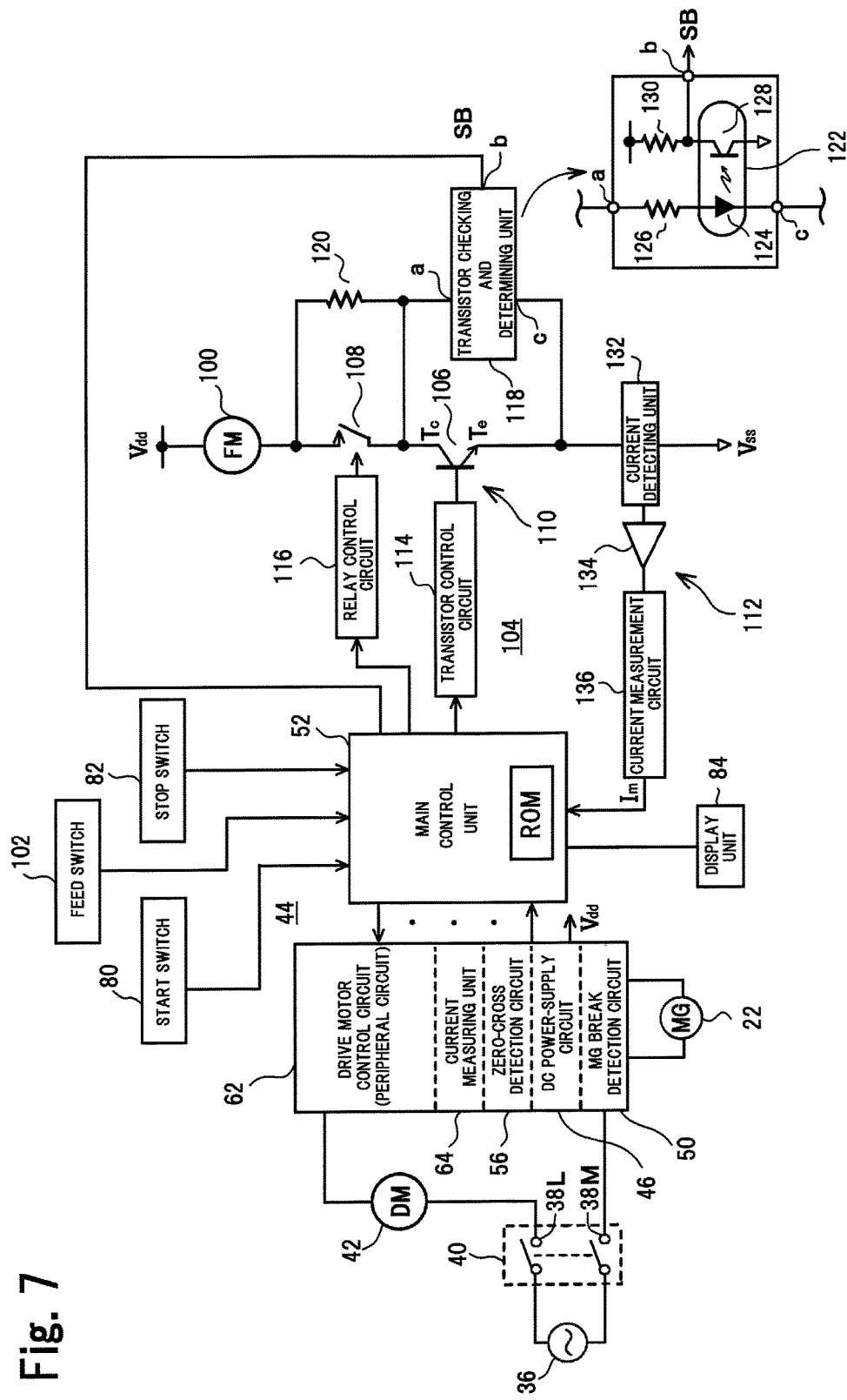
FIG. 7 is a block diagram depicting an electrical configuration of the portable drilling mechanism in accordance with another embodiment.

FIG. 7 depicts an electrical system configuration in a case where the portable drilling mechanism of this embodiment is provided with an electric feed mechanism. In the diagram, the same reference numerals are imparted to portions having similar configurations or functions to those of the above embodiment, with portions especially associated with the drive motor 42 being designated by simplified blocks.

In case of having the electric feed mechanism, as depicted in FIG. 7, there are provided a feed motor 100, an automatic feed switch 102, and a feed motor control circuit 104 for controlling the action of the feed motor 100.

The feed motor 100 is e.g., a DC motor which, mechanically, is drivingly connected via a gear mechanism (not depicted) to a feed mechanism (not depicted) within a longitudinal cylindrical casing 16 and which, electrically, is fed from the DC power-supply circuit 46 via a power-supply terminal at the DC power-supply voltage Vdd.

The feed motor control circuit 104 includes the main control unit 52; a transistor (switching element) 106 as a semiconductor switching element and a mechanical relay (circuit breaker) 108 that are connected in series with the feed motor 100 to the power-supply voltage terminals Vdd and Vss; a peripheral circuit 110 associated with the transistor 106 and the relay 108; and a current measuring unit 112 for measuring an electric current flowing through the feed motor 100.

The peripheral circuit 110 includes a transistor control circuit 114 that provides a switching control for the transistor 106 in response to a control signal from the main control unit 52; a relay control circuit 116 that controls the relay 108 in response to a control signal from the main control unit 52; a transistor checking and determining unit 118 that issues a determination result through transistor checking described later; and a bypass resistor 120 connected in parallel with the relay 108.

The transistor checking and determining unit 118 preferably uses a photo coupler 122 whose light-emitting element, e.g., light-emitting diode 124 and a bypass resistor 126 make up a series circuit that is connected in parallel with the transistor 110. A light-receiving element, e.g., a phototransistor 128 of the photo coupler 122 has an emitter terminal connected to a terminal at a ground potential Vss and a collector terminal connected via a resistor 130 to a terminal at a DC power-supply voltage Vcc and connected as an output terminal to an input port of the main control unit 52.

The current measuring unit 112 may be configured in the same manner as the current measuring unit 64 disposed in association with the drive motor 42 and has a current detecting unit 132, an amplification circuit 134, and a current measurement circuit 136.

In the general action (FIG. 5), turning on the start switch 80 (step A7) not only activates the drive motor 42 but also allows the feed motor 100 to start its rotation action. Afterwards, clutches (not depicted) are engaged by the handle operation to couple the feed mechanism via the clutches to the feed motor 100 so that the cutting tool C is lowered by the drive of the feed motor 100. When a hole is drilled in the workpiece W, the main control unit 52 reads a current value of the load current of the drive motor 42 through the current measuring unit 64 to thereby detect or recognize the completion of the drilling to reverse the feed motor 100 so that the cutting tool C is raised (retreated). At this time, the drive motor 42 continues to rotate. When the cutting tool C returns to its original position, a predetermined slide plate (not depicted) depresses a predetermined limit switch (not depicted) within the longitudinal cylindrical casing 16 to stop both the drive motor 42 and the feed motor 100 and wait for the power switch 40 off. When the user turns the power switch 40 off (step A6), the main control unit 52 deactivates all the units of the drive motor control circuit 44 and the feed motor control circuit 104 and the electromagnet 22 is also deenergized so that the main body is released from the magnetically firmly attracted state and becomes separable from the workpiece W.

Figure 8A:
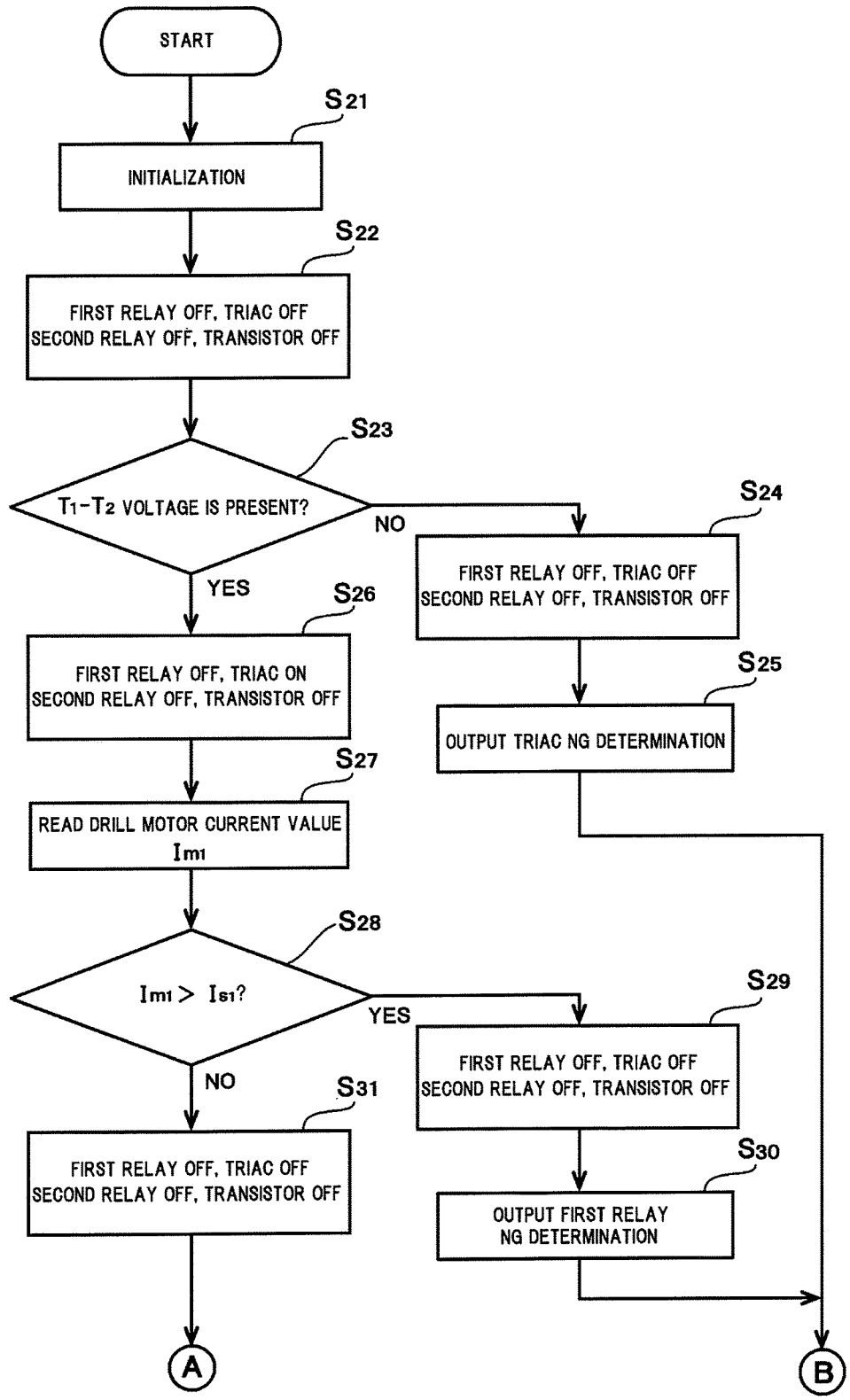
FIG. 8A is a flowchart depicting a detailed procedure of checkup of the motor control circuit in the another embodiment.
Figure 8B:
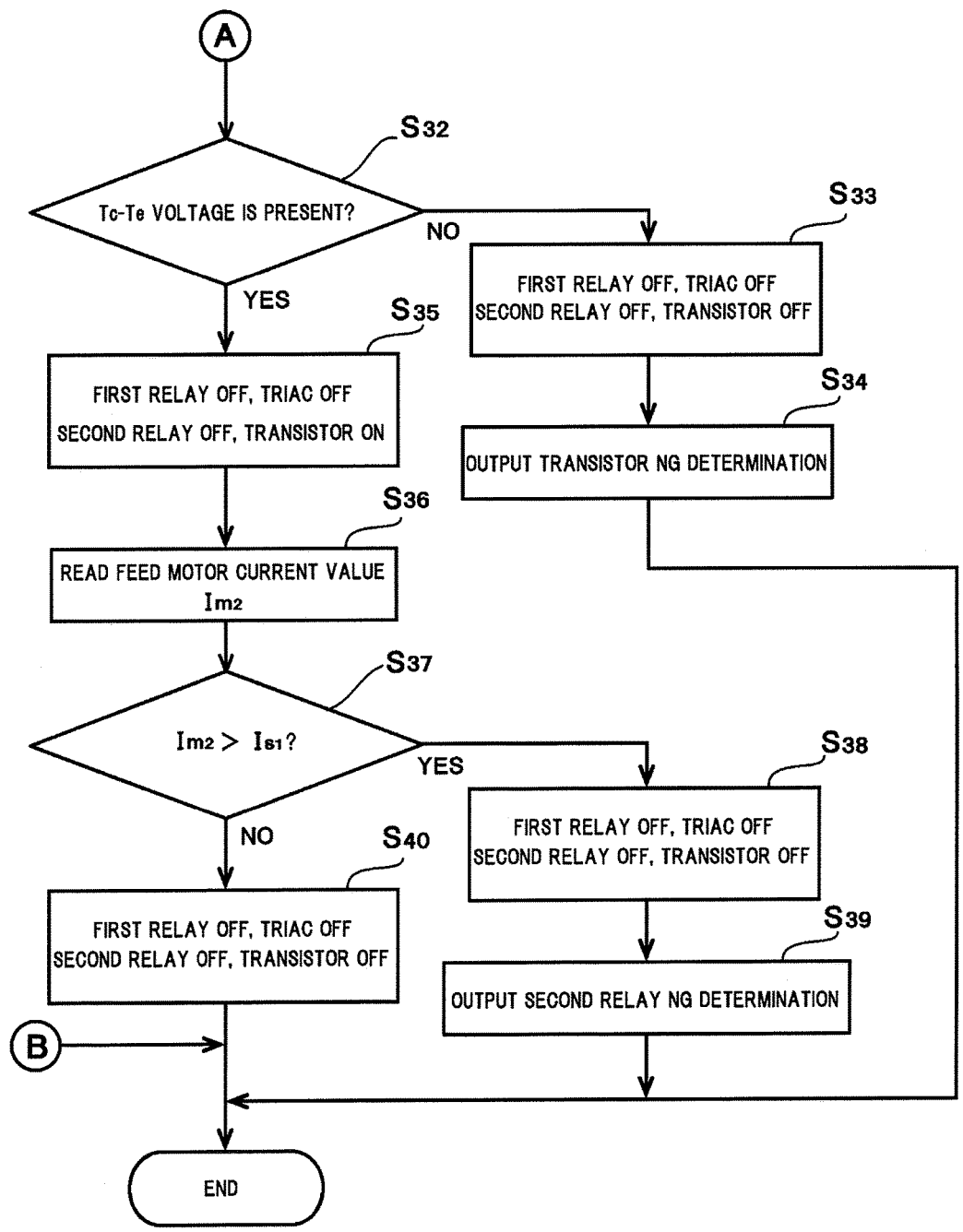
FIG. 8B is a flowchart depicting a detailed procedure of checkup of the motor control circuit in the another embodiment.

FIGS. 8A and 8B depict a detailed procedure of the checkup action (step A2) of the drive motor control circuit 44 and the feed motor control circuit 104 in this embodiment.

This checkup action is carried out immediately after closing the power switch 40. First, the main control unit 52 performs initialization required for this checkup action and the subsequent device actions (steps A2 to A11) (step S21).

Next, the main control unit 86 confirms that the first relay 60 and the triac 58 associated with the drive motor 42 are both off and that the second relay 108 and the transistor 106 associated with the feed motor 100 are both off (step S22), and then performs a check of the triac 58 by way of the triac checking and determining unit 70 in the same manner as the above embodiment (step S23).

If it is determined as a result of this triac check that the triac 58 has a short-circuit failure, then confirmation is made of that the first and the second relays 60 and 108 are both off and that the triac 58 and the transistor 106 are both off (step S24), after which a triac no good (NG) determination is output (step S25) to end this motor control circuit checkup action at this stage.

If it is determined on the triac check that the triac 58 is normal, then the first relay 60 is checked. In this first relay check, the main control unit 52 turns the triac 58 on at a desired duty (e.g., 100%) for a certain period of time (e.g., for 0.1 sec) by way of the triac control circuit 66 while keeping the first and the second relays 60 and 108 and the transistor 106 off (S26), reads a measurement value Im1 of a current flowing through the drive motor 42 from the current measuring unit 64, and compares the current measurement value Im1 with a reference value Is1 to determine whether the first relay 60 has a short-circuit failure based on this comparison result (step S28).

If it is determined that the first relay 60 has a short-circuit failure, then confirmation is made of that the first and the second relays 60 and 108 are both off and that the triac 58 and the transistor 106 are both off (step S29), after which a first relay no good (NG) determination is output (step S30) to end the motor control circuit checkup action at this stage. It is to be noted when the first relay 60 suffers from a short-circuit failure that similar to the above embodiment, the drive motor 42 hardly rotates since the triac 58 on-time is short.

If it is determined that the first relay 60 is free from any short-circuit failure and normal, then confirmation is made of that the first and the second relays 60 and 108 are both off and that the triac 58 and the transistor 106 are both off (step S31), to thereafter check the transistor 106 on the side of the feed motor 100 (step S32). This transistor check is carried out through the transistor checking and determining unit 118, and, if the output signal SB from the transistor checking and determining unit 118 goes low, the transistor 106 is determined to be normal (free from any short-circuit failure), whereas if the signal remains high, it is determined to be no good (of a short-circuit failure).

If the transistor 106 is determined to be no good (of a short-circuit failure), confirmation is made of that the first and the second relays 60 and 108 are both off and that the triac 58 and the transistor 106 are both off (step S33), to thereafter output a transistor no good (NG) determination (step S34) to end this motor control circuit checkup action.

If the transistor 106 is determined to be normal on the transistor check, the second relay 108 is then checked. In this second relay check, the main control unit 52 turns the transistor 106 on at a desired duty (e.g., 100%) for a certain period of time (e.g., for 0.1 sec) by way of the transistor control circuit 114 while keeping the first and the second relays 60 and 108 and the triac 58 off (S35), reads a measurement value Im2 of a current flowing through the feed motor 100 from the current measuring unit 114 (step S36), and compares the current measurement value Im2 with a reference value Is2 to determine whether the second relay 108 has a short-circuit failure based on this comparison result (step S37).

If it is determined that the second relay 108 has a short-circuit failure, then confirmation is made of that the first and the second relays 60 and 108 are both off and that the triac 58 and the transistor 106 are both off (step S38), after which a second relay no good (NG) determination is output (step S39) to end the motor control circuit checkup action at this stage. It is to be noted when the second relay 108 suffers from a short-circuit failure that similar to the above embodiment, the feed motor 100 hardly rotates since the transistor 106 on-time is short.

If it is determined that the second relay 108 is free from any short-circuit failure and normal, then confirmation is made of that the first and the second relays 60 and 108 are both off and that the triac 58 and the transistor 106 are both off (step S40), to end this motor control circuit checkup action.

As described hereinabove, this embodiment checks immediately after turning on the power switch 40 whether a short-circuit failure occurs in the triac 58 that is a switching element for controlling the rotational action of the drive motor 42 and in the first relay 60 that is a circuit breaker connected in series with the triac 58 and further whether a short-circuit failure occurs in the transistor 106 that is a switching element for controlling the rotational action of the feed motor 100 and in the second relay 108 that is a circuit breaker connected in series with the transistor 106, and, if any of them suffers from a short-circuit failure, issues an NG determination thereof and an alarm display (steps S25, S30, S34, S39, and A4) to urge the user to stop the work, i.e., to turn the power switch 40 off (step A5).

This enables the safety and the reliability of this portable drilling machine to be improved not only by continuing to issue a predetermined alarm display without activating the drive motor 42 when a short-circuit failure occurs in the triac 58 or the first relay 60 of the motor drive control circuit 44 but also by continuing to issue a predetermined alarm display without activating the feed motor 100 when a short-circuit failure occurs in the transistor 106 or the second relay 108 of the feed motor control circuit 104.

Another configuration is also feasible where when the feed switch 102 is turned on after closing the start switch 80, the feed motor 100 is operatively coupled to the feed mechanism without intervention of the clutches in response to the turning-on. In this case as well, when a short-circuit failure occurs in the transistor 106 or the second relay 108 of the feed motor control circuit 104, immediately after the motor control circuit checkup process (step A2) a predetermined NG display is provided (step A4) to thereby enable the safety and the reliability of this portable drilling machine to be improved.

In the feed motor control circuit 104, the transistor checking and determining unit 118 provides a similar working effect to that of the triac checking and determining unit 70 while the bypass resistor 120 provides a similar working effect to that of the bypass resistor 72.

Although the preferred embodiment of the present invention has been set forth hereinabove, the present invention is by no means limited to the above embodiment, but may otherwise be embodied or variously be modified without departing from the technical idea thereof. For example, the rotation driving unit for rotationally driving the tool holding unit may be composed of a drive motor in the form of a DC motor and a DC motor control circuit having a similar configuration to that of the feed motor control circuit 104. The automatic feed driving unit for advancing/retreating the tool holding unit may be composed of a feed motor in the form of an AC motor and an AC motor control circuit having a similar configuration to that of the drive motor control circuit 44. The transmission mechanism, the tool holding unit, etc., may also have various configurations or forms.

The invention claimed is:

1. A portable drilling machine comprising:
a drive motor for rotationally driving a cutting tool;
a motor control unit for controlling actions of the drive motor;
a portable main body mounted with the drive motor and the motor control unit; and
a fixing unit for fixing the main body to a workpiece;
the motor control unit comprising:
a switching element and a relay that are connected in series with the drive motor to power-supply terminals;
a first resistor connected in parallel with the relay, connected in series with the drive motor, and connected in series with the switching element to the power supply terminals;
a first determining unit connected in parallel with the switching element, for determining whether the switching element has a short-circuit failure;
a switching control unit that provides switching control for the switching element to control a motor current flowing through the drive motor; and
an on-off control unit for controlling the relay,
wherein the relay is kept off during the determining by the first determining unit, and the relay is kept on in making the drive motor take rotational actions.

2. The portable drilling machine of claim 1, wherein the motor control unit comprises:
a current measuring unit that measures a current value of a current flowing through the drive motor; and
a second determining unit for determining whether the relay has a short-circuit failure.

3. The portable drilling machine of claim 2, wherein
in the motor control unit immediately after fixing the main body to the workpiece by the fixing unit as a result of a power switch on for checking whether the relay has short-circuit failure,
the on-off control unit keeps the relay off,
the switching control unit subjects the switching element to a switching control at a desired duty, and
the second determining unit compares a current measurement value acquired by the current measuring unit with a predetermined reference value to issue a determination result depending on a result of the comparison.

4. The portable drilling machine of claim 1, wherein
in the motor control unit while the drive motor normally rotates in response to a predetermined switching operation,
the on-off control unit keeps the relay on, and
the switching control unit subjects the switching element to a switching control at a desired duty.

5. The portable drilling machine of claim 1, wherein
the drive motor is an AC motor,
the power-supply terminals are connected to an AC power supply, and
the switching element is a triac.

6. The portable drilling machine of claim 1, wherein
the drive motor is a DC motor,
the power-supply terminals are connected to a DC power supply, and
the switching element is a transistor.

7. A portable drilling machine comprising:
a rotation driving unit including a drive motor for rotationally driving a cutting tool;
a feed motor for advancing or retreating the cutting tool relative to the workpiece;
a motor control unit for controlling actions of the feed motor;
a portable main body mounted with the rotation driving unit, the feed motor, and the motor control unit; and
a fixing unit for fixing the main body to a workpiece;

the motor control unit comprising:
a switching element and a relay that are connected in series with the feed motor to power-supply terminals;
a first resistor connected in parallel with the relay, connected in series with the feed motor, and connected in series with the switching element to the power-supply terminals;
a first determining unit connected in parallel with the switching element, for determining whether the switching element has a short-circuit failure;
a switching control unit that provides switching control for the switching element to control a motor current flowing through the feed motor; and
an on-off control unit for controlling the relay,
wherein the relay is kept off during the determining by the first determining unit, and the relay is kept on in making the feed motor take rotational actions.

8. The portable drilling machine of claim 7, wherein the motor control unit comprises:
a current measuring unit that measures a current value of a current flowing through the feed motor; and
a second determining unit for determining whether the relay has a short-circuit failure.

9. The portable drilling machine of claim 8, wherein
in the motor control unit immediately after fixing the main body to the workpiece by the fixing unit as a result of a power switch on for checking whether the relay has short-circuit failure,
the on-off control unit keeps the relay off,
the switching control unit subjects the switching element to a switching control at a desired duty, and
the second determining unit compares a current measurement value acquired by the current measuring unit with a predetermined reference value to issue a determination result depending on a result of the comparison.

10. The portable drilling machine of claim 7, wherein
in the motor control unit while the feed motor normally rotates in response to a predetermined switching operation,
the on-off control unit keeps the relay on, and
the switching control unit subjects the switching element to a switching control at a desired duty.

11. The portable drilling machine of claim 7, wherein
the feed motor is an AC motor,
the power-supply terminals are connected to an AC power supply, and
the switching element is a triac.

12. The portable drilling machine of claim 7, wherein
the feed motor is a DC motor,
the power-supply terminals are connected to a DC power supply, and
the switching element is a transistor.

13. The portable drilling machine of claim 1, wherein
in the motor control unit immediately after fixing the main body to the workpiece by the fixing unit as a result of a power switch on for checking whether the switching element has a short-circuit failure,
the switching control unit keeps the switching element off,
the on-off control unit keeps the relay off, and
the first determining unit issues a determination result that depends on magnitude of a voltage across terminals of the switching element.

14. The portable drilling machine of claim 13, wherein
the first determining unit comprises:
a light-emitting element connected in parallel with the switching element;
a light-receiving element paired with the light-emitting element to make up a photo coupler; and
a binary signal generation circuit connected to the light-receiving element, for generating a signal having a first logical value when the light-receiving element is inactive and for generating a signal having a second logical value when the light-receiving element is active.

15. The portable drilling machine of claim 14, comprising a second resistor connected in parallel with the switching element and in series with the light-emitting element.

16. The portable drilling machine of claim 1, wherein
the fixing unit has an electromagnet integrally incorporated in the main body, the fixing unit energizing the electromagnet when a power switch goes on to electromagnetically adhere to the workpiece, the fixing unit deenergizing the electromagnet when the power switch goes off to release electromagnetic adhesion.

* * * * *